T. ELLIOTT.
RAILWAY CAR.
APPLICATION FILED MAR. 21, 1921.
1,386,852.
Patented Aug. 9, 1921.
10 SHEETS—SHEET 1.
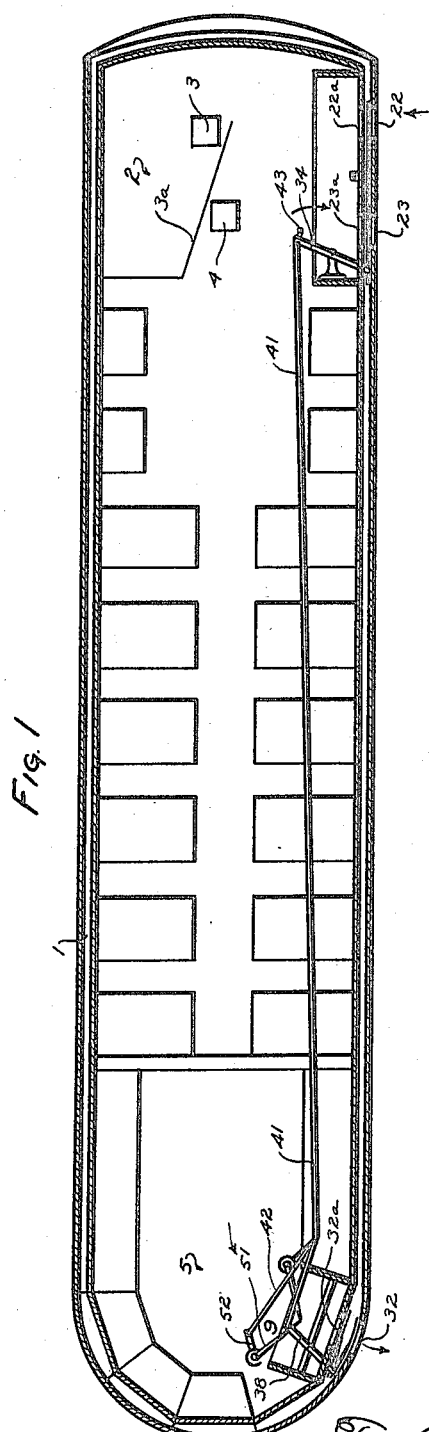
INVENTOR
Thomas Elliott
BY
Toulmin & Toulmin
ATTORNEYS

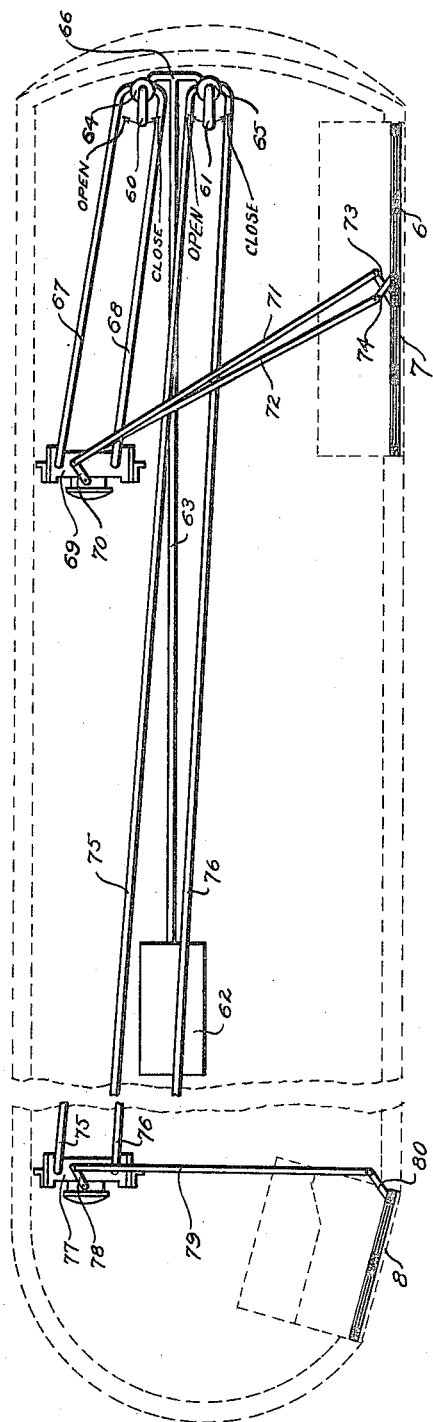

T. ELLIOTT.
RAILWAY CAR.
APPLICATION FILED MAR. 21, 1921.
1,386,852.
Patented Aug. 9, 1921.
10 SHEETS—SHEET 3.
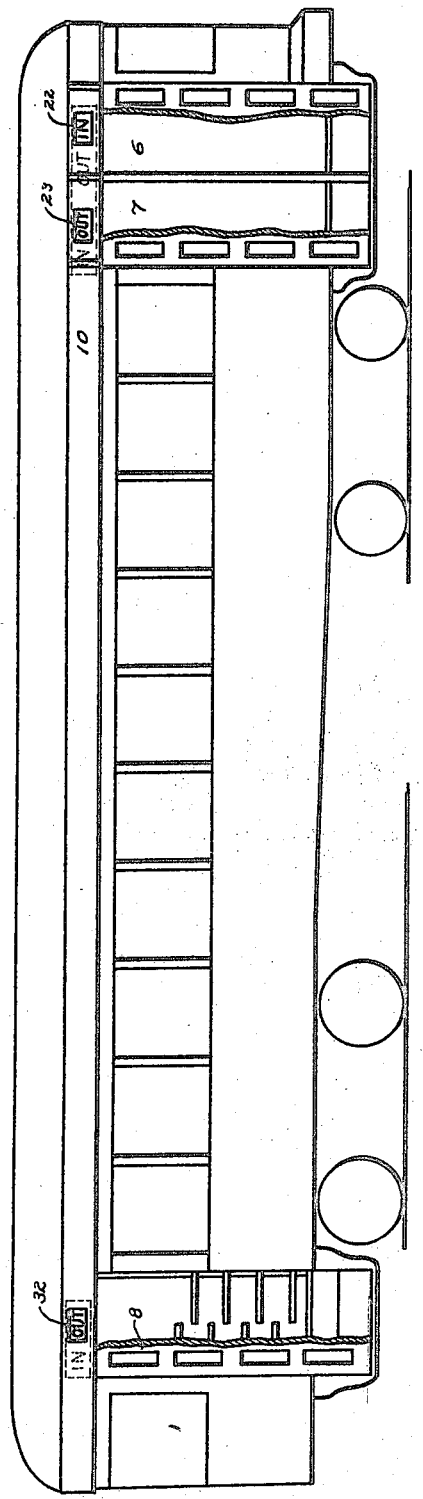
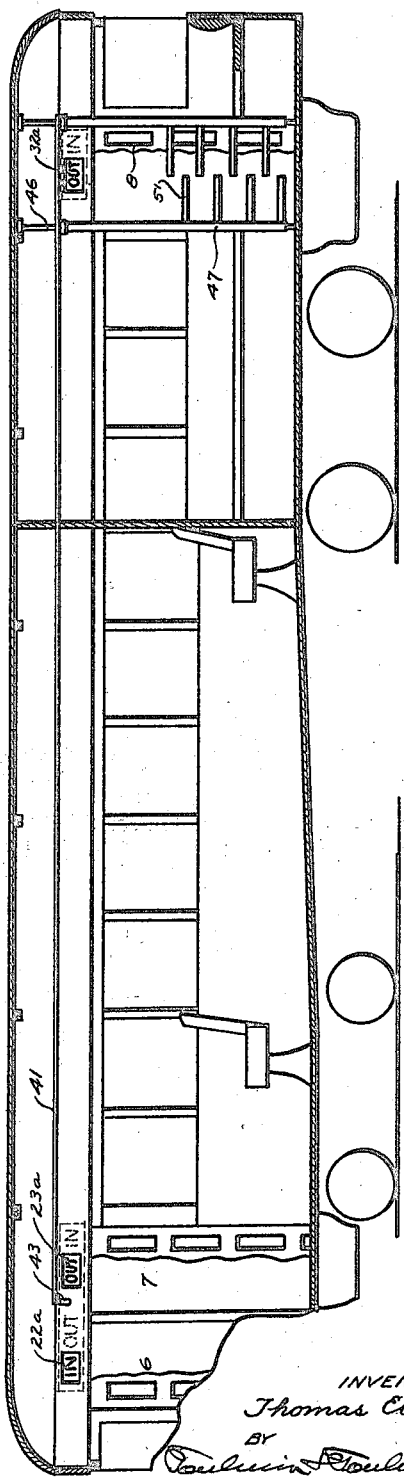
INVENTOR
Thomas Elliott
BY
Toulmin & Toulmin
ATTORNEYS

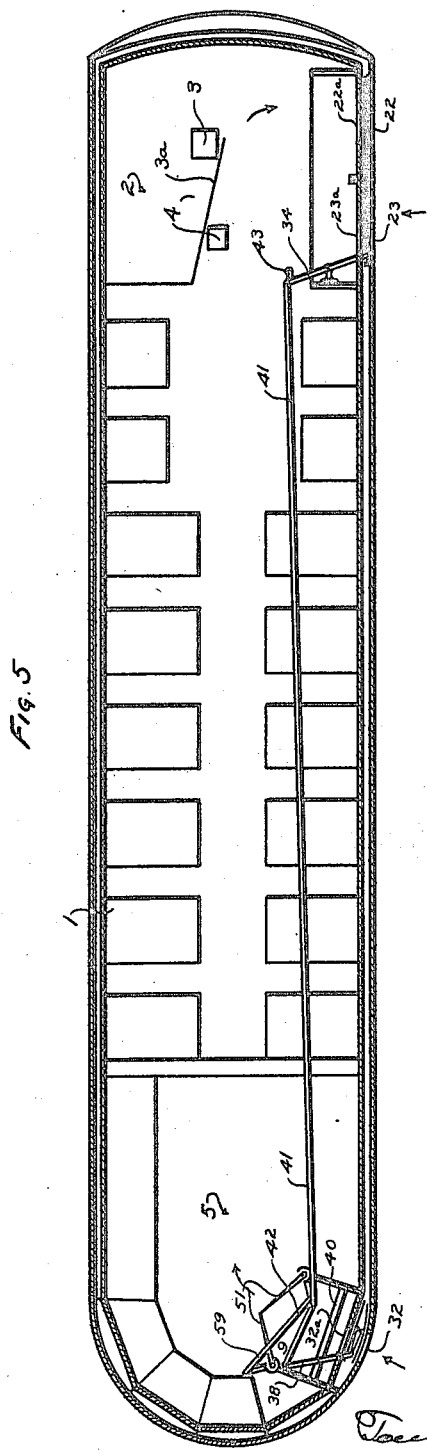

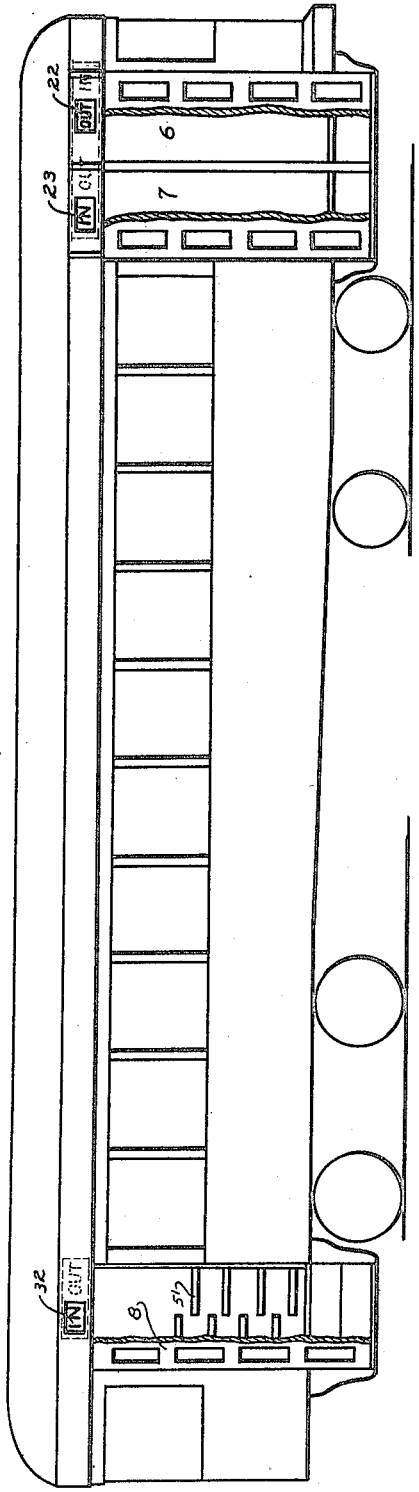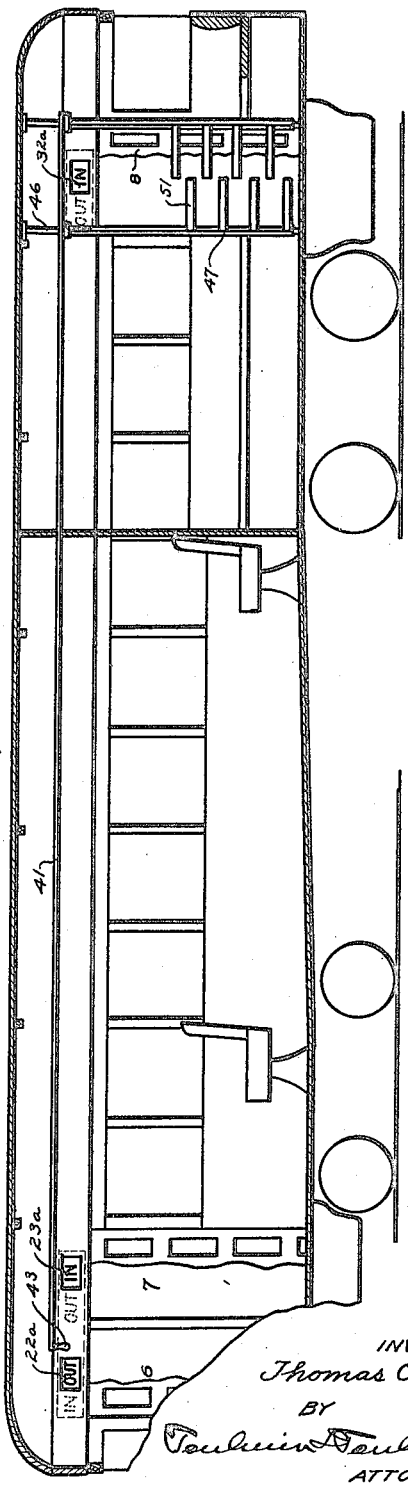

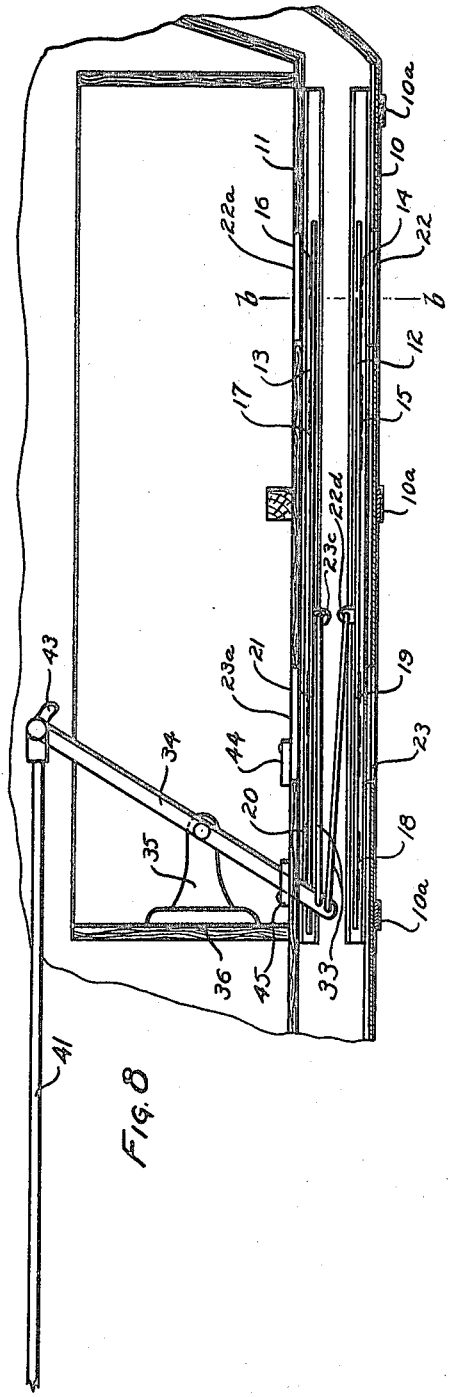

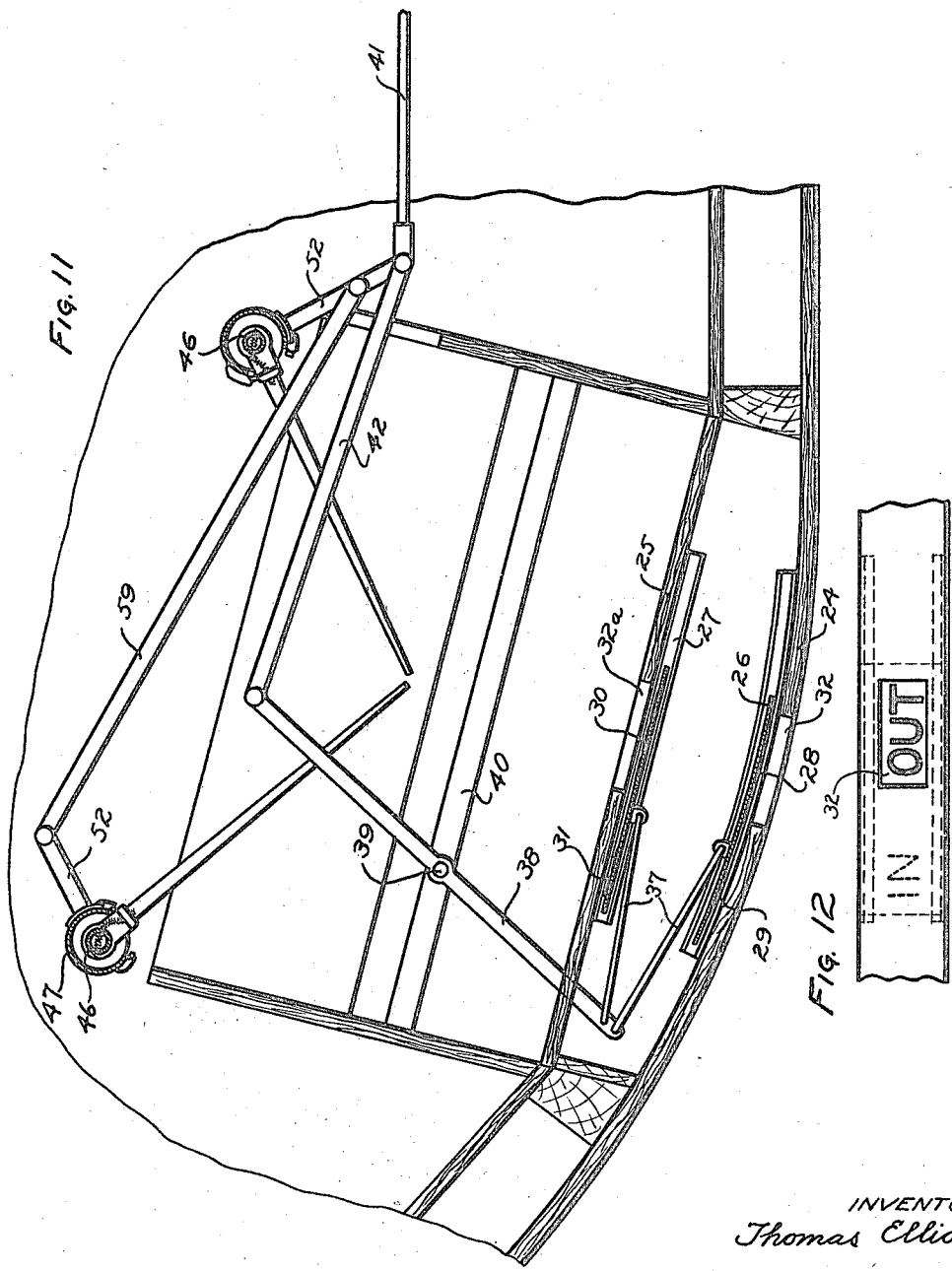

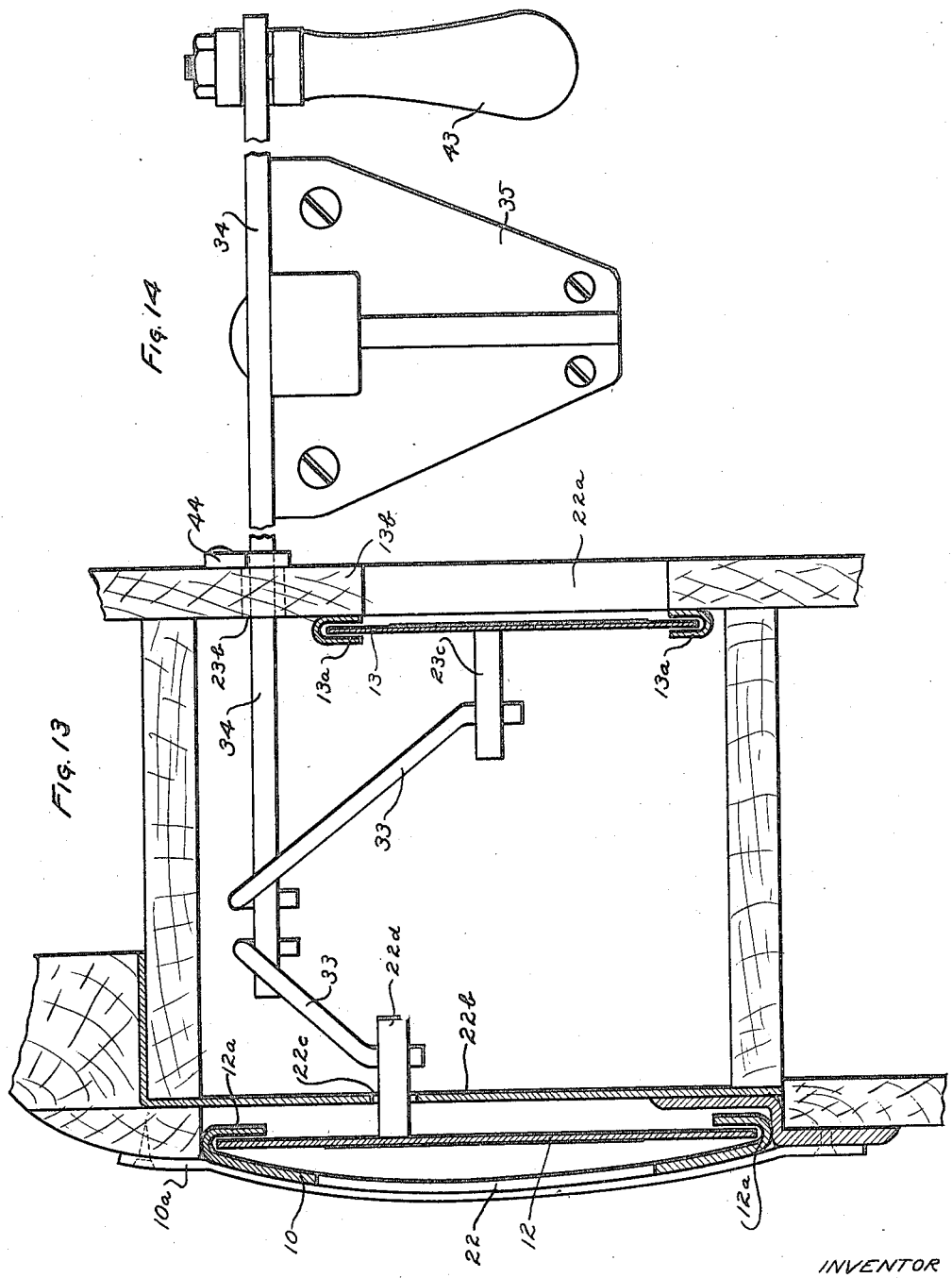

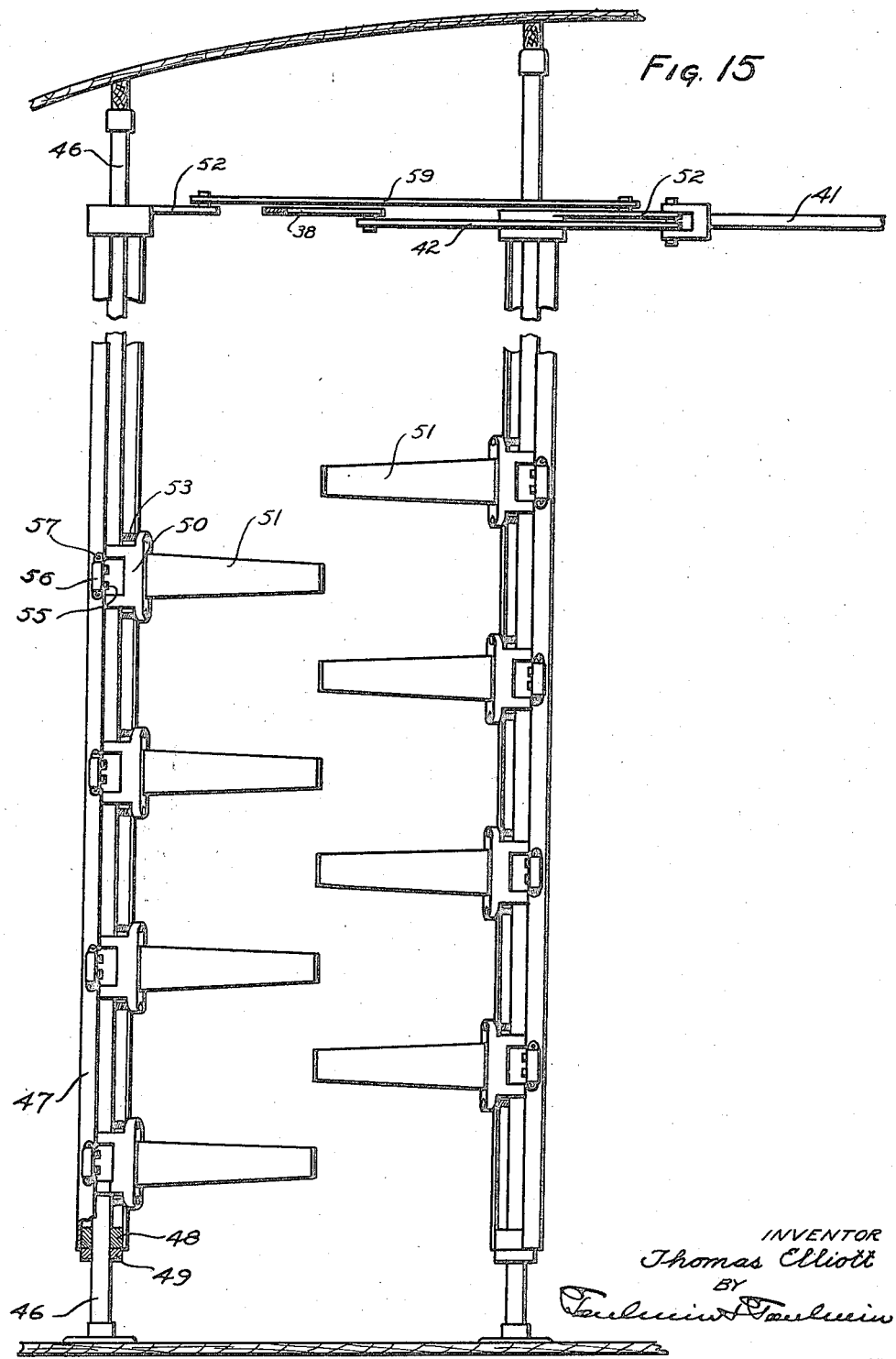

T. ELLIOTT.
RAILWAY CAR.
APPLICATION FILED MAR. 21, 1921.

1,386,852.

Patented Aug. 9, 1921.
10 SHEETS—SHEET 10.

INVENTOR
Thomas Elliott
ATTORNEYS

UNITED STATES PATENT OFFICE.

THOMAS ELLIOTT, OF CINCINNATI, OHIO, ASSIGNOR TO THE CINCINNATI CAR COMPANY, OF CINCINNATI, OHIO, A CORPORATION OF OHIO.

RAILWAY-CAR.

1,386,852.   Specification of Letters Patent.   Patented Aug. 9, 1921.

Application filed March 21, 1921. Serial No. 454,029.

*To all whom it may concern:*

Be it known that I, THOMAS ELLIOTT, a citizen of the United States, residing at Cincinnati, in the county of Hamilton and State of Ohio, have invented certain new and useful Improvements in Railway-Cars, of which the following is a specification, reference being had therein to the accompanying drawings.

This invention relates to railway cars, particularly of the class used on lines, one terminal of which is in the crowded or congested part of a city and the other terminal in a suburban or less congested or crowded district. The general objects of my invention are:—

First, to provide a one-man, one-way car to be used under the aforesaid conditions with a single system of signs and doorway controls or gates arranged and operated in a manner to permit of the cars being used on the system of "pay as you enter", as when leaving a suburban district or locality where the traffic is uncongested and scarce, or alternatively as a "pay as you leave" car, as when leaving a terminal where conditions of traffic are crowded. In this way, when the signs and doorway controls or gates are properly set passengers in a suburban or at non-congested points may enter the car and pay as they do so and leave it without the interruption of paying their fares when they are in the crowded or congested districts and terminal; or vice versa, passengers while in the crowded district or terminal may enter the car and later pay as they leave, when they get into the uncrowded or suburban localities, at which places there is more time and less confusion, giving opportunity to pay as they leave.

Second, to provide a car with a single system of signs and doorway controls, as gates, the signs being adjustable to indicate to passengers, both off the car and about to board it and in the car and desiring to leave it, which doorway to use for entrance and which to use for exit; and the controls or gates being adjustable to permit the passengers to enter or to exit at a doorway remote from the one-man or person operating the car.

Third, to combine with said system of signs and controls or gates, suitable doors by which the entrance and exit of passengers may be controlled in accordance with the designation "In" or "Out" displayed by the signs on the outside and inside of the car, such doors being located both in the doorway near the operator or motorman and in the doorway remote from him or near the other end of the car.

These several objects I carry into practical effect by the form of my invention illustrated herein.

In these drawings,

Figure 1 is a plan view of a one-way one-man car equipped with my system of signs and doorway control, showing it for "paying as you enter";

Fig. 2 is a view showing the front and rear doors and the mechanism to operate them from suitable cranks or levers in reach of the motorman; and the doorway controls and their operating mechanism;

Fig. 3 is a side elevation of such a car showing the signs from the outside when adjusted for "pay as you enter";

Fig. 4 is an interior view of such a car showing the signs in the same position as in Fig. 3;

Fig. 5 is a plan view of such a car so equipped showing it for "paying as you leave";

Fig. 6 is a side elevation of such a car showing the signs from the outside when adjusted for "paying as you leave";

Fig. 7 is an interior view of such a car showing the signs in the same position as in Fig. 6;

Fig. 8 is an enlarged detail view, partly in section and partly in plan, showing the sign system at one end of the car;

Fig. 9 is a side elevation of a portion of a car near the sign showing the "In" and "Out" designations and the sight openings;

Fig. 10 is a partial sectional view and elevation of the interior of the car showing the sign system at one end and the means for operating and locking the signs;

Fig. 11 is an enlarged plan view of one end of a car with the doorway control or gates, and also the sign mechanism;

Fig. 12 is a side elevation of a portion of a car near the sign showing the "In" and "Out" designation and the sight opening;

Fig. 13 is an enlarged sectional view on the line *b—b* of Fig. 8 showing the sign mechanism;

Fig. 14 is a detail view showing a part of the sign-operating mechanism;

Fig. 15 is an enlarged elevation of the doorway control or gate and its operating mechanism;

Figure 16:
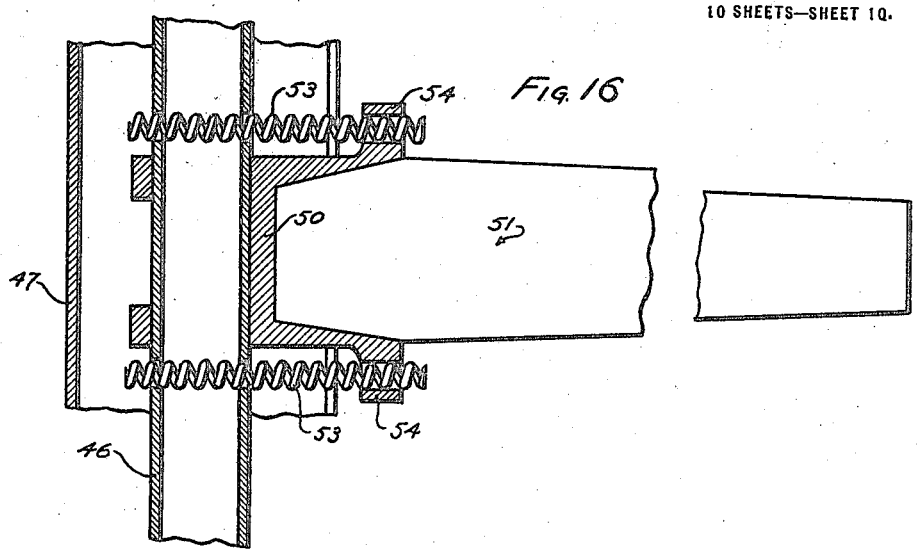
Fig. 16 is an enlarged detail view of one of the gates showing the manner of mounting it.

I will first describe my invention with reference to its use on cars on the "pay as you enter" system and then will later set forth its use on cars on the "pay as you leave" system, and will finally refer to the detail construction of the mechanism employed in carrying out its use on the cars on both of these systems.

Referring to the use or practice on the "pay as you enter" system attention is directed particularly to Figs. 1, 3 and 4, in which the signs and doorway controls or gates, (and incidentally the doors), are set for the "pay as you enter" system, which is used when the cars are starting from a suburban or less crowded district and running thence into a crowded city district or terminal.

The numeral 1 indicates a one-man one-way car that is to say, a car that will be operated by a motorman alone and will be run always with the same end forward. The forward end of this car is shown at 2, with a motorman's station at 3, a division rail or partition at 3ª, and a fare box at 4, while the rear end is shown at 5.

At the front end there is a double doorway controlled by doors 6 and 7, see Fig. 3, and at the rear end there is a single doorway controlled by a door 8 and inner doorway controls or gates, generally designated 9. These doors and these gates are actuated by the motorman from or near his station by mechanism later to be described.

Suppose now that the car is about to make its "In" trip by leaving a suburban or uncrowded district and running thence into a crowded city district or terminal. The passengers will observe as they approach the car or the car approaches them that the doors are all closed, but that over the extreme front door is the sign "In" while over the next door and the one to the rear is the sign "Out." When the car stops the door under the sign "In" will be opened by the motorman and the passengers will enter and pay by dropping their fares or tickets into the fare box 4.

When they get on the inside of the car and are seated they will observe that the sign "Out" will appear at two places, namely, over one of the front doors, 7, and over the rear door 8. These signs "Out," under these conditions, appear both from the outside of the car, as seen in Fig. 3, and from the inside, as seen in Fig. 4. And the gates 9 will also stand in the position shown in Fig. 1 so that they will yield or open outward upon a mere touch by the passengers.

Thus having entered by one of the front doors and having paid as they did so while in the suburban or uncrowded district they will now leave the car when in the crowded district or at the downtown terminal by the other front door and the rear door or by either of these doors. as may happen, according to whether the passengers turn from their seats and go to one or the other or both of the doors 7 and 8. And when the door 8 is opened the gates 9, standing as in Fig. 1, will not swing inward but will stand as guards to prevent any passenger from entering there while the car is still being used on the "pay as you enter" system.

Referring now to the use of my car on the "pay as you leave" system, which is employed when the car starts from a crowded district or downtown terminal and runs thence into the less crowded or suburban district, attention is called to Figs. 5, 6 and 7.

As the passengers approach the car or the car approaches them they will observe the signs "In" over the doors 7 and 8 which will be opened for them to enter. At this time the gates or controls 9 will have been adjusted by the motorman to stand inward, as shown in Fig. 5, so that passengers entering by the door 8 can push past the gate arms, yet no one can pass out by that door because of this position of the gates. During this entrance of passengers no fares will be collected or deposited either as to the passengers entering the rear or the forward door, but all will pass to their seats without having paid their fares.

But when the time comes to leave the car, as in the less crowded districts or at the suburban terminal the passengers will all do so by the extreme front door 6, and will be so directed by the fact that the signs will indicate the word "Out" over the door 6 only, the word "In" being still over the doors 7 and 8. Hence the passengers will pay when they pass the fare box 4 as they leave, making their exit through the only door over which the word "Out" appears.

Thus it will be seen that with my improved car I am enabled to meet two very important requirements, first, that of making it perfectly feasible to operate a car with one man, as a motorman, and, second. to do this in crowded districts and at a city terminal, as well as in sparsely settled districts and a suburban terminal. It will be seen that I am enabled to require but the one man or operator to observe and enforce the payment of fares and yet I provide for preventing the passengers from crowding one another by being detained to pay their fares as they enter in crowded districts, while on the other hand the passengers who enter in the sparsely settled districts and pay their fares then are not delayed when leaving the car after reaching the crowded districts.

I will now refer to the sign mechanism. Over the doorways and between the panel 10 on the outside of the car, usually called the sign-board, and the inner wall 11 I place sign slides 12 and 13 with the word "In" at the point 14 and the word "Out" at the point 15 on the outer slide 12 and with the word "In" at the point 16 and the word "Out" at the point 17 on the inner slide 13. The outer slide 12 also has the word "In" at the point 18 and the word "Out" at the point 19, while the inner slide has the word "In" at the point 20 and "Out" at the point 21.

The outer panel 10 has a sight opening 22 through which either the word "In" or "Out" at 14 or 15 will be exposed and a sight opening 23 through which either the word "Out" or "In" at the point 19 or 18 will be exposed. The inner wall also has a sight opening 22ª corresponding to the sight opening 22, the words "In" or "Out" at the point 16 or 17 appearing opposite the opening 22ª, according to adjustment, while the inner wall also has another sight opening 23ª corresponding to the opening 23, but for the observance of either the word "Out" at 21 or the word "In" at 20, according to adjustment.

Thus it will be seen that when the slides 12 and 13 are adjusted in one position the word "In" will appear through the openings 22 and 22ª and the word "Out" through the openings 23 and 23ª, placing the word "In" above the door 6 and the word "Out" above the door 7 on both the inside and outside of the car, while with another adjustment of the slides the word "Out" at 15 and 17 will appear through the openings 22 and 22ª, while the word "In" at 18 and 20 will appear through the openings 23 and 23ª, in the former adjustment the word "In" standing over the door 6 and the word "Out" over the door 7, as seen in Fig. 3, and in the latter position the word "Out" appearing over the door 6 and the word "In" over the door 7, as shown in Fig. 6.

I have now described the sign arrangement at the forward end of the car. I will next describe it at the rear end of the car. See particularly Figs. 3, 6 and 11. Between the panel 10 in the portion thereof designated 24 and the inner wall at the portion 25 I place the sign slides 26 and 27. On the slide 26 I place the word "Out" at the point 28 and the word "In" at the point 29, while on the inner slide 27 I place the word "Out" at the point 30 and the word "In" at the point 31. I provide a sight opening 32 for the words on the outer slide and 32ª for the words on the inner slide. When the slides are adjusted to expose the word "Out" as in Fig. 3, it will show through the sight opening 32 on the outside and 32ª on the inside and will stand over the rear door and when they are adjusted to the other position the word "In" will show through the outer opening 32 and the inner one 32ª.

In Fig. 3 the word "Out" appears over the door 8 because the car, as shown in that figure, is operating as a "pay as you enter" so that the passengers or some of them will pass out of the door 8, as also by the door 7. In Fig. 6 the word "In" appears over the door 8 because in that case the car is operating as a "pay as you leave" and the passengers will enter by the door 8, as also by the door 7.

Referring now to the preferred means for actuating the sign slides and referring particularly to Figs. 8 and 13, the numeral 33 designates two links, one connected to each slide and both connected to a lever 34 pivoted to a bracket 35 secured at a convenient point to the end of the car, as at 36. When the lever is actuated it, in turn, reciprocates the slides the proper distance to bring the words "In" and "Out" opposite their respective sight openings, as before stated. This description applies to the slide mechanism at the forward end of the car.

Referring now to that at the rear end, 37 designates the links, one connected to each sign slide and both connected to a lever 38 pivoted at 39 on a bar 40 suitably supported in the car. The levers 34 and 38 are interconnected by a rod 41 and a link 42, as shown in Figs. 8 and 11. A handle 43 secured to the lever 34 is used by the motorman to shift the levers and properly adjust the signs.

In order to secure the lever 4 in any adjusted position a pair of detent hooks 44 and 45 are used, as seen in Figs. 10 and 13. When the lever 34 is in one position, say that shown in Fig. 8, the detent 45 through its hook will engage one side of it and when it is thrown to the opposite position the hook of the detent 44 will then engage the lever. But any suitable devices may be employed for this purpose.

In Fig. 13 I have enlarged the view so as to show more clearly how the slides 12 and 13 are maintained. 12 is sustained in a guide 12ª at its upper and lower edges and 13 is similarly sustained in a guide 13ª at the top and bottom. The panel 10 overlaid by sustaining strips 10ª has the sight opening 22 already referred to and the inner sheet or lining 22ᵇ is slotted at 22ᶜ for controlling the lug 22ᵈ to which is connected one of the rods 33.

The inner wall of the car is also slotted, as shown at 23ᵇ to permit the lever 34 to travel when actuating the slides. The slide 13 has a lug 23ᶜ to which is connected the other link 33.

Referring now to the gate mechanism more clearly illustrated in Figs. 11, 15 and 16, it will be seen that it is comprised of uprights 46 secured to the car floor and say to the ceiling, and of a long sleeve 47 rotatably fitted on each rod by spacing blocks 48 and sustained by collars 49.

Figure 17:
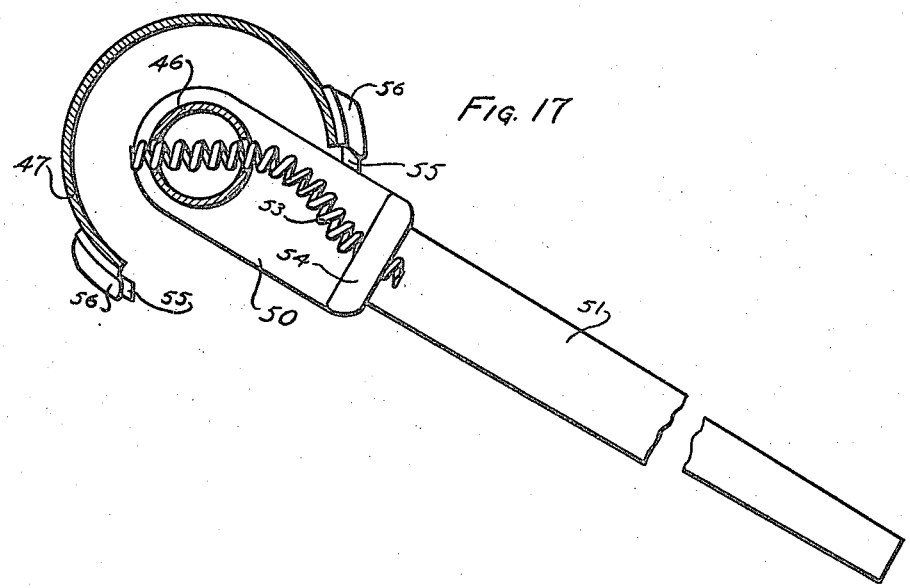
Fig. 17 is a plan view of the same.

On the upright 46 are a series of brackets 50 adapted to receive the ends of the arms 51. These sleeves 47 have crank arms 52 secured to their upper ends which, when operated by the means presently to appear, will partially rotate them so as to change the position of the arms from that shown in Figs. 1 and 11, in which position the passengers may exit through the rear door, to the position shown in Fig. 5, in which the passengers may enter through the rear door. In either case they will brush past the arms and push them in the direction in which the passenger is moving. During these swinging movements of the arms, so that they will open apart for the passage of the passengers, the sleeves 47 are held stationary by the operating mechanism and the brackets 50 turn on the uprights 46. The springs 53 which pass through the uprights 46 and through lugs 54 on the brackets yield sidewise when the arms are so swung and act to return the arms to their normal set position. In order to limit these swinging movements of the arms I provide stops composed of bumpers 55 fitted in holders 56 which are fastened by screws 57, or otherwise, to sleeves 47, the sleeves being open on one side, as seen in Fig. 17. The position of the stops 55 is such that the arms may be swung to the desired extent to permit passengers to pass between the opposing arms. This done, the arms spring back to normal through the action of the springs 53.

Referring now to the mechanism for adjusting the sleeves 47 to place the arms in position for exit or position for entrance of passengers I interconnect the arms 52 by a pitman 59 and attach one of the arms 52 to the actuating rod 41 by which the slides are interconnected. In this way the arms or doorway controls are adjusted at the same time that the sign slides are adjusted so that the indicating words on the slides will agree with the position of the controls, as when the controls are in the position shown in Fig. 1 the word "Out" will appear, whereas, if they are in the position shown in Fig. 5 the word "In" will appear.

Referring now to the door operating means, attention is called to Fig. 2 where one means is shown, though others may be used. No novelty is claimed as to these features. But it will be seen that by the motorman taking hold of the hand piece 60 he can open and close the forward doors and similarly by grasping the hand piece 61 he can open and close the rear door. Speaking in detail this door mechanism may be described as follows:

An air reservoir tank 62 is secured to the car and through an air line or pipe 63 it connects with an air valve 64 used in operating the front doors and with an air valve 65 used in operating the rear doors through a pipe 66. From the valve 64 air lines or pipes 67 and 68 extend to an "engine" 69 whose interior devices actuate a crank arm 70 to which are connected operating rods 71 and 72. When the handle 60 is turned to the point indicated by the word "open" it allows the compressed air to pass to one end of the engine 69 and actuate the crank arm to cause the rods 70 and 71 to open the doors 6 and 7, the rod 71 connecting by a crank 73 to the door 7 and the rod 72 connecting by a crank 74 to the door 6. Each door is composed of two sections hinged together and arranged to fold when the doors are swung inward to open position. When the handle 60 is adjusted to the point indicated by the word "close" the air is cut off from the pipe 67 and enters the pipe 68 and reverses the direction of the crank 70 and thereby draws upon the rods 71 and 72 and closes the doors 6 and 7.

Referring now to the rear door it will be seen that the valve 65 connects by pipes 75 and 76 with the engine 77 whose interior mechanism actuates the crank arm 78 connected by a rod 79 with a crank 80 of the door 8. When the handle 61 is adjusted to the position marked "open" the air will pass from the valve 65 through the pipe 75 into the engine 77 and through the interior devices operate the crank arm 78 to cause the rod 79 to push against the crank 80 and thereby open the door. This door is made in two hinged sections so that one section will fold on the other as the door is opened. To close the rear door the handle 61 is adjusted to a point opposite the word "close" at which time the air will then pass through the pipe 76 to the engine 77 and reverse the direction of motion of the crank arm 78 and the rod 79 and the crank 80 and close the door 8.

These means are those in common use and are merely illustrated for the purpose of showing how my doors are within the control of the operator when standing at his position at the forward end of the car.

From the foregoing description of the uses and operation of my car and the several mechanisms it will be fully understood how a one-man one-way car is provided and made capable of use alternately as a "pay as you enter" and "pay as you leave" car. The signs and doorway controls being located on one side of the car, I term this my single system as distinguished from my double system set forth in my companion application filed of even date herewith, Ser. No. 454,030.

Having thus fully described my invention, what I claim as new and desire to secure by letters patent is:—

1. A one-way one-man car having front and rear doorways, and sign mechanism adapted to exhibit an entrance legend at the front doorway and an exit legend at the rear doorway, or vice versa, so that such car may be used as a pay as you enter car when the entrance legend is exhibited at the front door and the exit at the rear or as a pay as you leave car when the entrance legend is at the rear and the exit legend at the front.

2. A one-way one-man car having front and rear doorways, and sign mechanism adapted to exhibit an entrance legend at the front doorway and an exit legend at the rear doorway, or vice versa, so that such car may be used as a pay as you enter car when the entrance legend is exhibited at the front door and the exit at the rear or as a pay as you leave car when the entrance legend is at the rear and the exit legend at the front, doors for said doorways, a doorway control for the rear door, and operating mechanism for said doors and control.

3. A one-way one-man car having front and rear doorways, sign slides having "In" and "Out" legends located adjacent each doorway and adapted when in one position to exhibit "In" for the front doorway and "Out" for the rear doorway, or vice versa, mechanism to so operate said slides, doors for the doorways and a doorway control for the rear doorway and adapted to open outward for exit and inward for entrance, and mechanism for operating said doors and doorway control.

4. A one-way one-man car having a double doorway and double doors at the front and a single doorway and door at the rear, and doorway controls for the rear doorway adapted to open for exit or for entrance, mechanism for operating said doors and doorway controls from a common point, and sign slides adjacent the front door and the rear door and adapted to exhibit the legends "In" and "Out" at the front doors and "Out" at the rear door, and alternately to exhibit "Out" and "In" at the front and "In" at the rear, and operating devices for the slides.

5. A one-way one-man car having a front doorway, a rear doorway, double signs for each doorway, each sign being adapted to exhibit its legend of "In" and "Out" to persons both outside and inside the car.

6. A one-way one-man car having a double front doorway and single rear doorway, and sign slides for both doorways and sight openings to exhibit the sign legends both from the outside and the inside, the legend for one part of the front doorway indicating entrance and the other exit when the legend for the rear doorway indicates exit.

7. A one-way one-man car having a double front doorway and single rear doorway, and sign slides for both doorways and sight openings to exhibit the sign legends both from the outside and the inside, the legend for one of the front doorways indicating entrance and the other exit when the legend for the rear doorway indicates entrance.

8. A car having legend sight openings, a pair of sign slides, one having legends exhibited outward and the other legends exhibited inward through said openings, respectively.

9. A car having a pair of sight openings exhibiting outward and a pair of sight openings exhibiting inward, and sign slides mounted to slide back and forth past said sight openings and having entrance legends which show through the outer and the inner sight openings when the slides are in one position and having exit legends which exhibit through the other sight openings when the slides are in another position, and mechanism to operate said slides.

10. A single end car having front sight openings exhibiting inward and outward and rear sight openings exhibiting inward and outward, and signs coöperating with said openings and having legends on the front sign indicating entrance and exit, respectively, and legends on the rear sign indicating entrance and exit, and mechanism interconnecting said signs and operating to exhibit both entrance and exit on the front sign and exit on the rear sign.

11. A single end car having front sight openings exhibiting inward and outward and rear sight openings exhibiting inward and outward, and signs coöperating with said openings and having legends on the front sign indicating entrance and exit, respectively, and legends on the rear sign indicating entrance and exit, and mechanism interconnecting said signs and operating to exhibit both entrance and exit on the front sign and entrance on the rear sign.

12. A one-way one-man car having a double doorway and doors at the front and a single doorway and door at the rear, and door controls for the rear doorway adapted selectively to open for exit and for entrance, and mechanism for operating said doors and doorway controls from a common point.

13. A one-way one-man car having a doorway, a door therefor, and a doorway control adapted selectively to open for exit and for entrance, and mechanism for operating said door and doorway control from a common point.

14. The combination, with a car having a doorway, of a door and a doorway control, the latter comprising members adjustable for exit or for entrance and adapted to spring apart as passengers pass outward or inward.

15. The combination, with a car having a doorway, of a door and a doorway control comprising members and stops therefor, the members being adapted to swing apart as passengers pass in one direction, and to oppose the entrance of passengers in the other direction, and mechanism to adjust said members to positions to permit passengers to exit or enter, and other mechanism to operate said door.

In testimony whereof I affix my signature.

THOMAS ELLIOTT.